(12) United States Patent
Varinot et al.

(10) Patent No.: US 6,567,656 B1
(45) Date of Patent: May 20, 2003

(54) CONTROLLING SURVEILLANCE MONITORING OF MOBILE STATION COMMUNICATIONS AT INTER-EXCHANGE HANDOFF

(75) Inventors: Patrice Varinot, Outremont (CA); Michel Houde, Ville St-Laurent (CA)

(73) Assignee: Telefonaktiebolaget L M Ericssson (publ), Stockholm (SE)

( * ) Notice: Subject to any disclaimer, the term of this patent is extended or adjusted under 35 U.S.C. 154(b) by 340 days.

(21) Appl. No.: 09/666,897

(22) Filed: Sep. 20, 2000

(51) Int. Cl.[7] .............................................. H04M 15/00
(52) U.S. Cl. ....................... 455/405; 455/410
(58) Field of Search ................................ 455/405, 408, 455/410, 404, 461; 379/35

(56) References Cited

U.S. PATENT DOCUMENTS

| | | | |
|---|---|---|---|
| 5,913,161 A | * | 6/1999 | Ozulkulu et al. ............ 455/405 |
| 5,937,345 A | * | 8/1999 | McGowan et al. .......... 455/410 |
| 2002/0051518 A1 | * | 5/2002 | Bondy et al. .................. 379/35 |
| 2002/0150096 A1 | * | 10/2002 | Sjoblom ...................... 370/389 |

FOREIGN PATENT DOCUMENTS

| | | |
|---|---|---|
| WO | WO 99/17499 | 4/1999 |
| WO | WO 99/29089 | 6/1999 |

OTHER PUBLICATIONS

JSI Newsletter 2000 No. 1: Jan. 17, "CALEA Duties, Deadlines, Petitions, and Costs: A Review of LEC Compliance," pp. 1–8, dated Sep. 7, 2000.

FCC News Release (unofficial announcement), "FCC Adopts CALEA Technical Standards," pp. 1–4, dated Aug. 27, 19999.

FCC News Release, Report No. ET 98–8, "FCC Proposes Rules to Meet Technical Requirements of CALEA," pp. 1–4, dated Oct. 22, 1998.

FCC 98–282, "Further Notice of Proposed Rulemaking," adopted: Oct. 22, 1998; Released: Nov. 5, 1998, pp. 1–66.

GnatBuzz!, Global Network & Advanced Technology Committee Report, "What is CALEA?," Jun. 1998, pp. 1–10.

Interim Standard (Trial Use Standard), Lawfully Authorized Electronic Surveillance, TIA/EIA/IS–J–STD–025–A (Revision of TIA/EIA/IS–J–STD–025), May 2000, pp. 1–192.

* cited by examiner

Primary Examiner—Lee Nguyen
(74) Attorney, Agent, or Firm—Jenkens & Gilchrist; Sandra Beauchesne

(57) ABSTRACT

Control is exercised over a tap connection made for law enforcement agency monitoring of mobile station communications in response to an inter-exchange hand-off. Where such a tap connection does not yet exist at hand-off, pre-hand-off actions taken at the target exchange trigger an analysis of whether a party to that communication is marked for monitoring followed by an establishment of the tap connection at hand-off if the party is so marked. If the tap connection is already in place, pre-hand-off actions taken at the target exchange trigger an analysis of whether law enforcement agency monitoring of that communication is lawfully authorized with respect to the target exchange followed by instructing the anchor exchange to terminate the tap connection at hand-off if monitoring is not lawfully authorized.

22 Claims, 3 Drawing Sheets

FIG_2

CONTROLLING SURVEILLANCE MONITORING OF MOBILE STATION COMMUNICATIONS AT INTER-EXCHANGE HANDOFF

BACKGROUND OF THE INVENTION

1. Technical Field of the Invention

The present invention relates to law enforcement agency. surveillance monitoring of a mobile station operating within a cellular telephone network and, in particular, to controlling the monitoring of a marked mobile station at instances of inter-exchange hand-off.

2. Description of Related Art

It is well known in the art for law enforcement agencies to tap telecommunications trunk connections for the purpose of monitoring voice conversations (calls or communications), signaling data, short message service messages and the like. Telecommunications switches in the network are programmed with a stored list of telephone numbers assigned to subscribers whose use of the network is to be monitored. Whenever a switch handles a communication connection set-up from/to a calling/called party (or message delivery, or signaling activity) where the calling party or called party identification number matches a number on the stored list, the switch requests the establishment of a trunk connection (comprising the tap) with a monitoring center. If the request is granted, a tap trunk connection is established with the monitoring center and then connected (in a manner much like the formation of a conference or three-way call) into the subscriber call connection.

This conventional well known technique for triggering an opportunity for law enforcement agency monitoring is applicable generally speaking solely to the setting up of a communication to/from a marked called/calling party. If the call is initially handled at set-up by a switch that has marked the called/calling party for monitoring, then the tap is established and the surveillance takes place (typically for the duration of the communication). If, on the other hand, the switch at call set-up does not have the called/calling party marked, the tap is not requested and no surveillance occurs for the remainder of that communication.

One problem experienced with this conventional approach for triggering law enforcement monitoring arises when a non-monitored communication is subsequently served, following the occurrence of an inter-exchange hand-off, by a switch where one of the called or calling parties is marked for monitoring. Historically in this case, because no monitoring was initially established in response to the communication at set-up, no surveillance monitoring occurs after the inter-exchange hand-off because the hand-off does not constitute a communication set-up event that would trigger a request for a tap connection. There is a need for a mechanism to control law enforcement monitoring to trigger the establishment of the tap connection in such cases.

Another problem arises with respect to the duration of the monitoring. Conventionally, such monitoring, once started, continues until the communication is terminated. However, if the monitored communication undergoes an inter-exchange hand-off from a jurisdiction where such monitoring is lawfully authorized to a jurisdiction where the monitoring is not authorized, the continuation of monitoring following hand-off may violate the law and jeopardize the material information lawfully collected before hand-off. There is a need for a mechanism to control or inform law enforcement monitoring to (if necessary) terminate the tap trunk connection in respect of such jurisdictional (legal) limitations to lawful monitoring.

SUMMARY OF THE INVENTION

A mobile station cellular communication that is not currently being monitored by a law enforcement agency undergoes an inter-exchange hand-off. A target exchange for that hand-off responds to a facilities request from an anchor exchange by first determining that a party to that communication has been marked for law enforcement agency monitoring and then establishing a tap connection to a law enforcement agency monitoring center to begin monitoring of that communication following the completion of the inter-exchange hand-off. For an inter-exchange hand-off of a law enforcement agency monitored mobile station cellular communication, on the other hand, the target exchange for that hand-off first determines that law enforcement agency monitoring of that communication is not lawfully authorized with respect to the target exchange and then sends a tap connection termination message back to an originally handling exchange (the anchor) instructing the anchor exchange to terminate its tap connection with a law enforcement agency monitoring center following the completion of the inter-exchange hand-off. In each case, mobile station party location information may be collected by an exchange and delivered to the law enforcement agency monitoring center. Additionally, information may be provided from the exchanges to the law enforcement agency monitoring center indicating that the actions taken (establishing or terminating the tap connection) are being taken in response to an inter-exchange hand-off.

BRIEF DESCRIPTION OF THE DRAWINGS

A more complete understanding of the method and apparatus of the present invention may be acquired by reference to the following Detailed Description when taken in conjunction with the accompanying Drawings wherein.

DETAILED DESCRIPTION OF THE DRAWINGS

Figure 1:
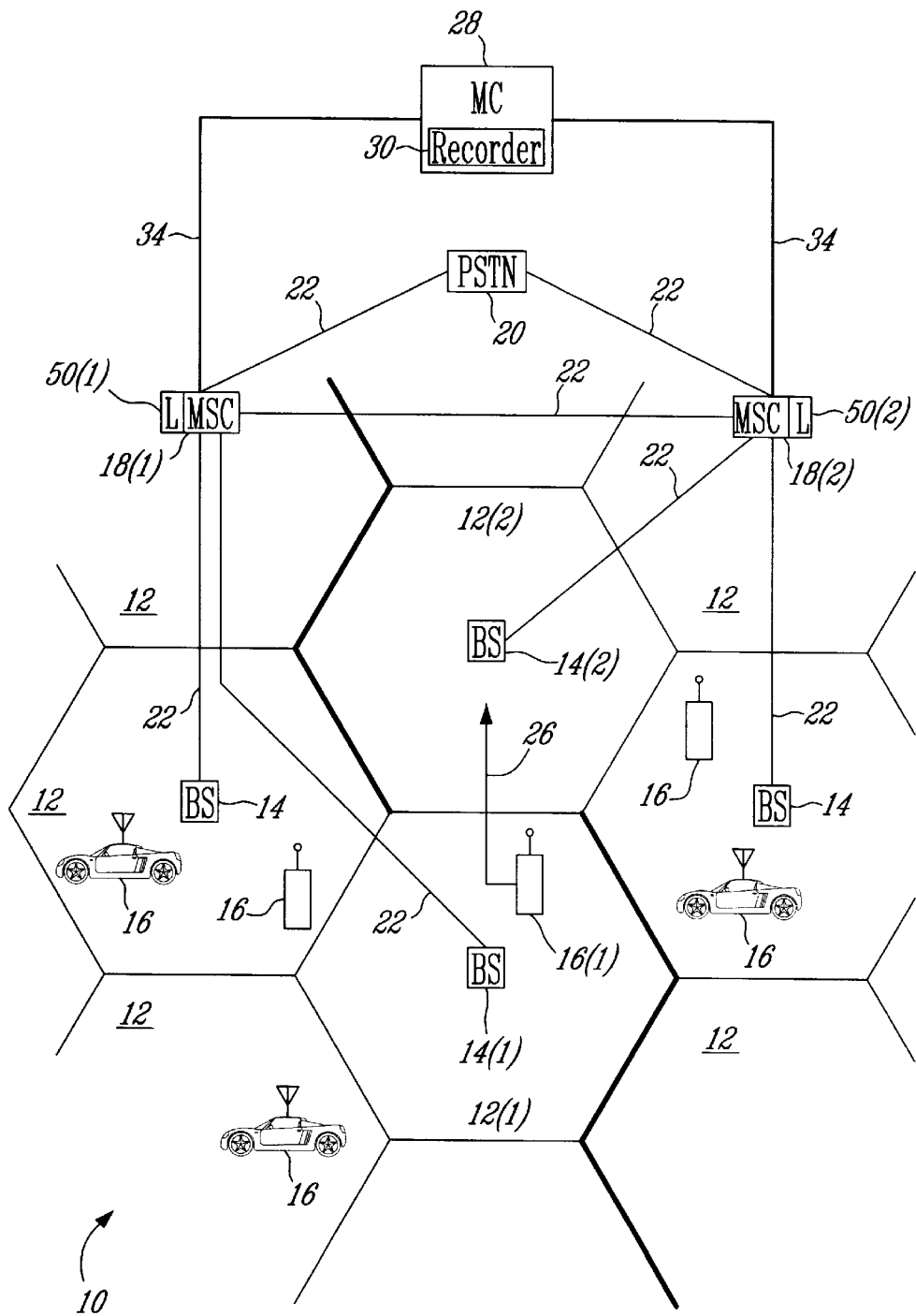
FIG. 1 is a diagram illustrating an exemplary configuration for a cellular telephone network in which the present invention may be implemented.

Reference is now made to FIG. 1 wherein there is shown a cell diagram illustrating an exemplary cell configuration for a cellular telephone network 10 in which the present invention may be implemented. The cellular telephone network 10 operates in accordance with one of a number of known air interface types including, for example, a frequency division multiple access (FDMA) protocol or a time division multiple access (TDMA) protocol or a code division multiple access (CDMA) protocol, or other suitable protocol, which provides for the use of at least one control channel and a plurality of traffic channels per cell 12. In the network 10, a base station 14 is provided for each of the cells 12. The base stations 14 engage in simultaneous communications with plural mobile stations 16 operating roughly within the area of the associated cell 12. The control channel assigned to each cell 12 is used to carry system control messages between the base station 14 and proximately located mobile stations 16, and also to assist in the network with mobile station cell re-selection. Such control messages include call originations, page signals, page response signals, location registration signals, traffic channel assignments, maintenance instructions, and cell selection or re-selection instructions. The traffic channels provided in each cell 12 are used to carry subscriber voice or data communications between the base station 14 and proximately located mobile stations 16.

The base stations 14 further communicate via signaling links and voice trunks 22 with a central control station, commonly referred to as a mobile switching center 18, which functions, to control operation of the network 10. The mobile switching centers 18 are interconnected with each other and to the public switched telephone network (PSTN) 20 by the signaling links and voice trunks 22. The mobile switching centers 18 operate to selectively connect subscriber voice and data communications to the mobile stations 16 through its base stations 14. Thus, the mobile switching centers 18 control system operation through and in response to the transmission of control messages over the control channels to set-up on the traffic channels communications that are either originated by or terminated at the mobile stations 16.

Law enforcement agencies are often authorized to monitor cellular telephone communications (such as calls, signaling, short messages, and the like) to obtain evidence for use in criminal investigations. To accomplish this goal, a monitoring center (MC) 28 is established which may include one or more tape recorders 30 for recording the voice/data communications (calls, messages, signaling and call data relating thereto) that is being monitored. The physical connection with the voice portion of the cellular telephone network 10 which enables monitoring is made through a tap connection 34. Voice trunks are provided with the tap connection 34 to carry subscriber mobile station 16 communications to the monitoring center 28 and the recorders 30 therein. Signaling links within the tap connection 34 carry the network communications signals between the mobile switching center 18 and the monitoring center 28 that are used for requesting and setting up trunk connections for the tap 34. The tap 34 may be made at any location within the cellular telephone network 10 in a manner well known to those skilled in the art, but is typically made through a requesting one or ones of the mobile switching centers 18 where the subscriber to be monitored is currently located (or roaming; i.e., the serving mobile switching center at communication set-up). The law enforcement agency monitoring center 28 utilizes the tap 34 (and in particular one of the trunks thereof) to monitor the voice communication (which may be recorded by tape recorder 30 for future use) as well as signaling information, short message service messages, and the like.

Each mobile switching center 18 is programmed with a stored list (L) 50 of directory numbers for those subscribers whose use of the network relating to communications, calls, signaling, and messages, are to be monitored by a law enforcement agency. The list 50 may be different in each switch 18. When a mobile switching center 18 handles a leg of an initial call set-up and can match a calling or called party identification associated with that set-up leg to an entry on the stored list 50, the switch transmits a request for a tap trunk connection to the monitoring center 28. Once the request is granted, a tap trunk connection 34 with the monitoring center 28 is assigned, connected into the communication by the mobile switching center 18, and the communication is monitored (recorded).

The mobile switching centers 18 further control, through and in response to control and traffic channel transmissions, the hand-off of a subscriber communication from a traffic channel of one cell 12 to a traffic channel of another cell as the subscriber mobile station 16 roams throughout the cellular service area during an ongoing communication. As the mobile stations 16 move within the service area of the network 10, instances arise where a mobile station passes between two cells 12 served by the same mobile switching center 18, or from one cell served by a first mobile switching center 18(1) to another cell served by a second mobile switching center 18(2). In moving between the cells 12 in either case, the mobile stations 16, a change is made in the base station through which cellular radio communications are being effectuated.

The handing off of a communication from one mobile switching center 18 to another mobile switching center (referred to herein as an "inter-exchange hand-off") gives rise to several complications with respect to controlling law enforcement agency monitoring of that communication. First, it is possible that the subscriber may be marked for law enforcement monitoring in the currently serving mobile switching center following hand-off but not marked in the originally serving mobile switching center (also referred to as the anchor). When this occurs, no law enforcement tap connection would be established at inter-exchange hand-off because one was not previously established at communication set-up and the trigger for making such a connection is assessed only at communication set-up from/to a marked calling/called party (not in response to an inter-exchange hand-off implicating such a marked party). It would be beneficial if such monitoring could be triggered at inter-exchange hand-off with respect to a marked subscriber mobile station. Second, it is possible that law enforcement agency monitoring of the marked subscriber may be legally authorized within the jurisdiction of the anchor mobile switching center but not so authorized with the jurisdiction of the currently serving mobile switching center following an inter-exchange hand-off. This is a concern as a lawfully established tap at the beginning of a communication may, at inter-exchange hand-off, become unlawful. It would be beneficial if the monitoring could be dynamically terminated (or controlled) in response to an inter-exchange hand-off to comport with the pertinent jurisdictional authorization for monitoring.

Figure 2:
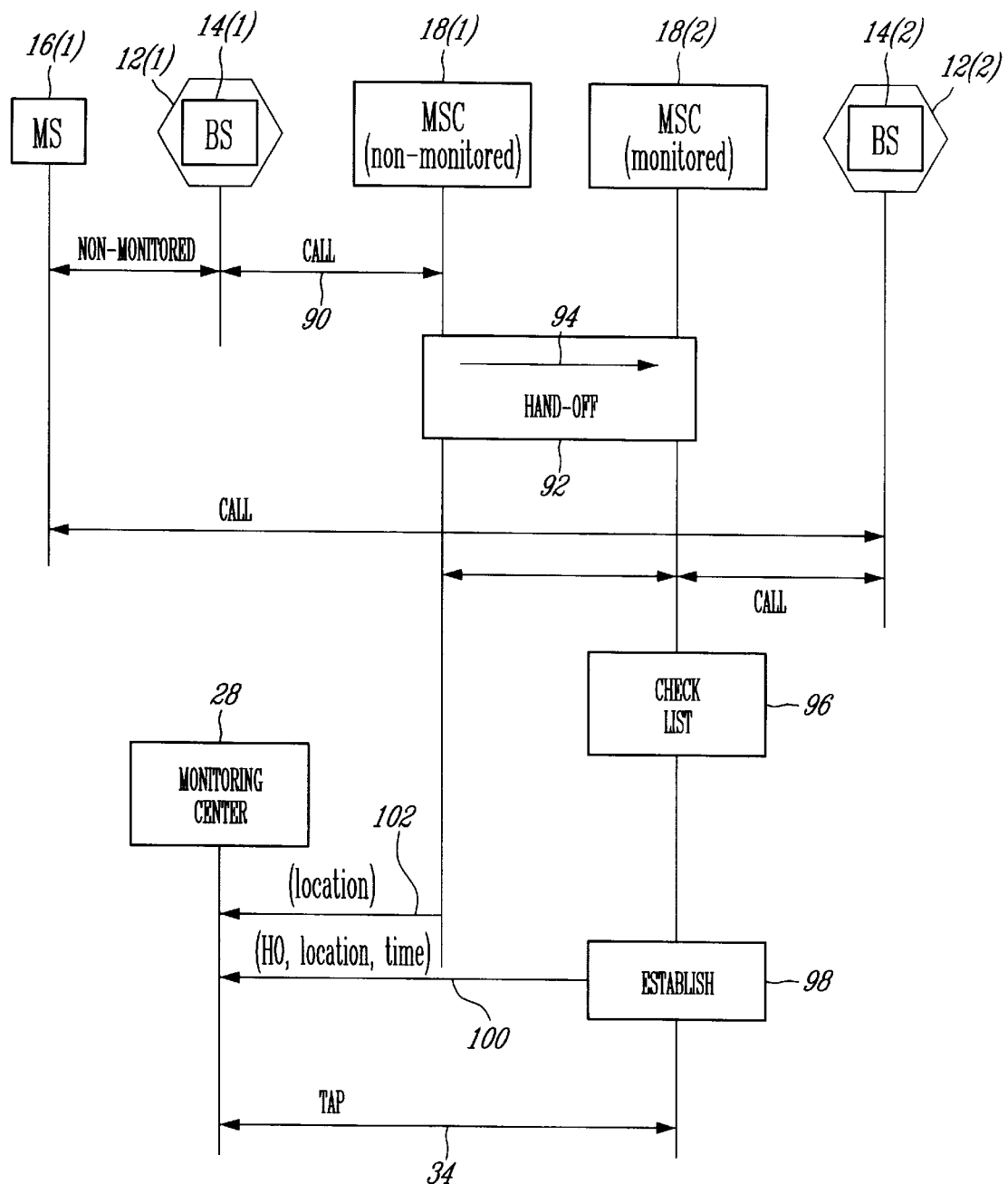
FIG. 2 is a message flow and network operation diagram illustrating operation of the network of FIG. 1 in connection with the triggering of law enforcement agency monitoring at inter-exchange hand-off.

Reference is now made in combination to FIGS. 1 and 2 wherein FIG. 2 is a message flow and network operation diagram illustrating operation of the network 10 of FIG. 1 in connection with the initiation of law enforcement agency monitoring of a communication at inter-exchange hand-off. In the illustrated example, a mobile station 16(1) already engaged in a non-monitored call 90 (or other type of communication, including signaling and short message) moves from a cell 12(1) served by a first mobile switching center 18(1)—the anchor exchange—to a cell 12(2) served by a second mobile switching center 18(2)—the target or serving exchange. Responsive thereto, and in accordance with procedures well known to those skilled in the art, the call 90 is handed-off 92 from the first mobile switching center 18(1) to the second mobile switching center 18(2).

It is assumed for this example that the mobile station 16(1) is marked for law enforcement agency monitoring in the list 50(2) of mobile switching center 18(2), but is not so marked in the list 50(1) of mobile switching center 18(1). It should be recognized by those skilled in the art that the lists 50 maintained in each mobile switching center 18 will contain different entries. As part of the hand-off process, the mobile switching center 18(1) sends a message 94 to the mobile switching center 18(2) requesting assignment (and reservation) of a traffic channel for hand-off to the target cell 12(2). This message 94 is commonly known as a facilities directive (FACDIR or FACDIR2) message, and is used to signal seizure at the mobile switching center 18(2) of a traffic channel to handle the call 90 following hand-off. Responsive to receipt of the traffic channel assignment (FACDIR or FACDIR2) message 94, the target mobile switching center 18(2) triggers to check in action 96 its list 50 to determine whether the identification (mobile directory number—MDN, mobile identification number—MIN, international mobile station identification—IMSI, electronic serial number—ESN, IP address, and the like) of the served mobile station 16(1) is found on this list. To accomplish this goal it is important that the message 94 include as many of the different mobile station identifiers listed above as possible to maximize the chances of catching an instance where law enforcement monitoring has been requested. Preferably, all known identifiers for the mobile station are provided. An appropriate indication can also be provided to indicate which one or ones of the various available identifiers should be given priority of both use and detection. If the mobile station 16(1) identifier provided in the message 94 is identified as being on the list, a trunk connection 34 is established 98 through appropriate set-up procedures with the monitoring center 28 and that connection is switched into the on-going (previously non-monitored) call. If appropriate or requested, the serving mobile switching center 18(2) may further (perhaps in connection with the establishment 98 operation) send a message 100 to the monitoring center that includes an indication (HO) that the tap is being established in response to an inter-exchange hand-off, and also an indication of the current location (cell ID or geographic position as perhaps provided by a mobile positioning system) of the monitored subscriber station 16(1). Additionally, information may be included in the message 100 concerning the time when the hand-off occurred. Still further, the previously serving mobile switching center 18(1) may send a message 102 to the monitoring center 28 at completion of the inter-exchange hand-off that includes an indication of the current location (cell ID or geographic position) of the monitored subscriber station 16(1), and perhaps also including a time stamp (similar to the message 100).

Figure 3:
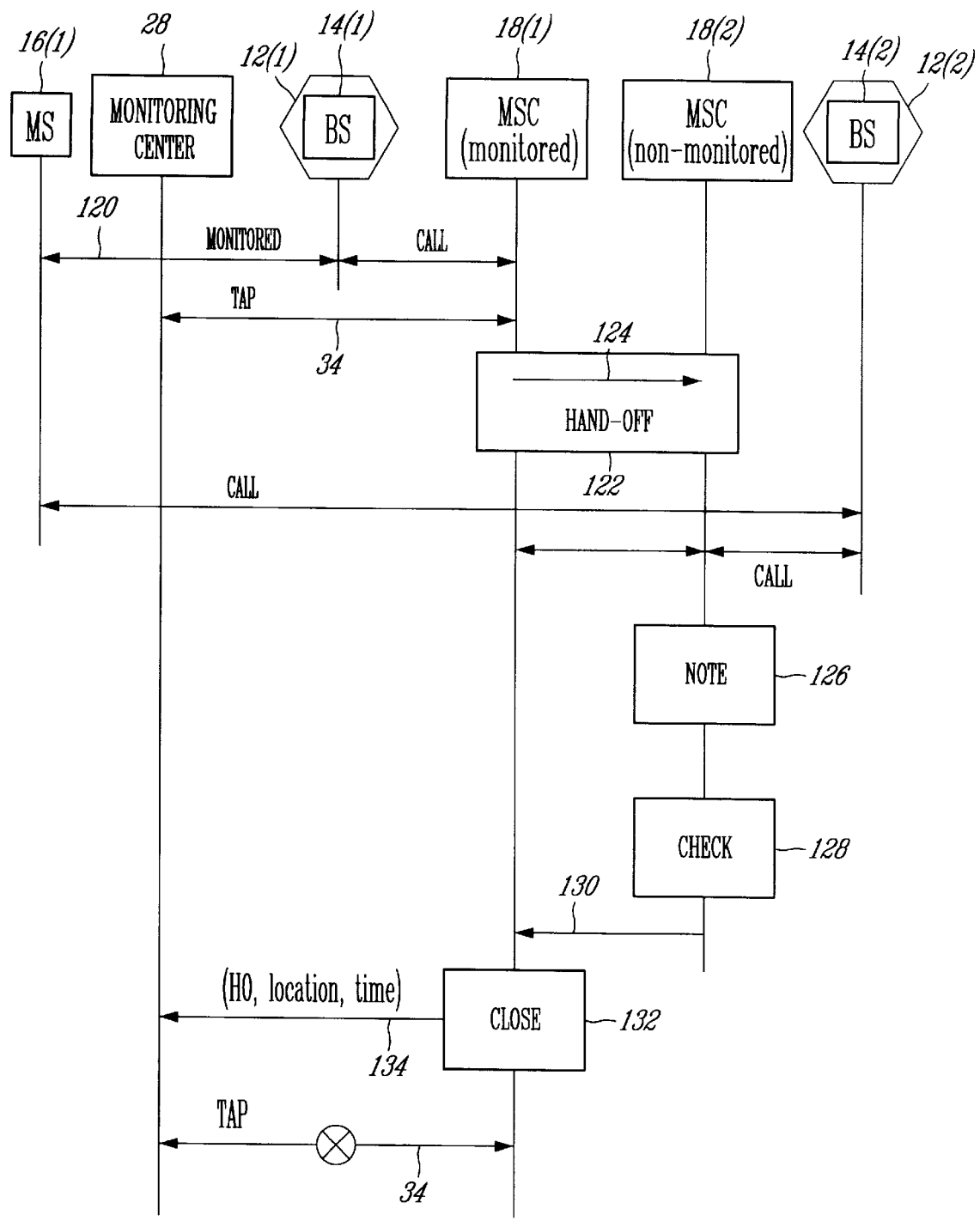
FIG. 3 is a message flow and network operation diagram illustrating operation of the network of FIG. 1 in connection with the termination of law enforcement agency monitoring at inter-exchange hand-off.

Reference is now made in combination to FIGS. 1 and 3 wherein FIG. 3 is a message flow and network operation diagram illustrating operation of the network 10 of FIG. 1 in connection with the termination of law enforcement agency monitoring of a call at inter-exchange hand-off. In the illustrated example, a mobile station 16(1) already engaged in a monitored call 120 (or other type of communication, including signaling and short message), through tap connection 34, moves from a cell 12(1) served by a first mobile switching center 18(1) to a cell 12(2) served by a first mobile switching center 18(2). Responsive thereto, and in accordance with procedures well known to those skilled in the art, the call 120 is handed-off 122 from the first mobile switching center 18(1) to the second mobile switching center 18(2).

It is assumed for this example that law enforcement agency monitoring of mobile station 16(1) communications is legally authorized within the jurisdiction containing the mobile switching center 18(1), but is not legally authorized within the jurisdiction containing the mobile switching center 18(2). As part of the hand-off process, the mobile switching center 18(1) sends a message 124 to the mobile switching center 18(2) requesting assignment (and reservation) of a traffic channel for hand-off to the target cell 12(2). This message 124 is commonly known as a facilities directive (FACDIR or FACDIR2) message, and is used to signal seizure at the mobile switching center 18(2) of a traffic channel to handle the call 120 following hand-off. Responsive to receipt of the traffic channel assignment (FACDIR or FACDIR2) message 124, the target mobile switching center 18(2) notes in action 126 that the mobile station is being monitored, checks in action 128 whether law enforcement agency monitoring is authorized in the jurisdiction of the mobile switching center 18(2). Notification of such monitoring could be expressly provided by the mobile switching center 18(1) at hand-off, or could be detected by the mobile switching center 18(2) at hand-off.

As an example, monitoring may not be authorized at all within that jurisdiction. If monitoring is authorized, the originally established tap remains in place and law enforcement monitoring continues without interruption. If, on the other hand, action 128 determines that monitoring is not authorized, a message 130 is sent back to the mobile switching center 18(1) instructing termination of law enforcement agency monitoring. Responsive to that message, the mobile switching center 18(1) closes in action 132 (see, X indication) the tap connection 34 to the monitoring center 28. If appropriate or requested, the previously serving mobile switching center 18(1) may (perhaps in connection with the close 132 operation) send a message 134 to the monitoring center that includes an indication (HO) that the tap is being terminated in response to an inter-exchange hand-off, and also an indication of the current location (cell ID or geographic position) of the monitored subscriber station 16(1).

As another example, there may not exist any authorization to monitor the specific party to the call within the jurisdiction of the mobile switching center. Accordingly, the mobile switching center 18(2) checks in action 128 its list 50 to determine whether the identification (MDN, MIN, IMSI, ESN, IP address, and the like) of the served mobile 20 station 16(1) is found on this list. To accomplish this goal it is important that the message 124 include as many of the different mobile station identifiers listed above as possible to maximize the chances of catching an instance where law enforcement monitoring has been requested. Preferably, all known identifiers for the mobile station are provided. An appropriate indication can also be provided to indicate which one or ones of the various available identifiers should be given priority of both use and detection. If the mobile station 16(1) is identified on the list, the originally established tap remains in place and law enforcement monitoring continues without interruption. If, on the other hand, action 128 determines that the mobile station 16(1) identification is not on the list, a message 130 is sent back to the mobile switching center 18(1) instructing termination of law enforcement agency monitoring. Responsive to that message, the mobile switching center 18(1) closes in action 132 (see, X indication) the tap connection 34 to the monitoring center 28. If appropriate or requested, the previously serving mobile switching center 18(1) may (perhaps in connection with the close 132 operation) send a message 134 to the monitoring center that includes an indication (HO) that the tap is being terminated in response to an inter-exchange hand-off, and also an indication of the current location (cell ID or geographic position) of the monitored subscriber station 16(1).

As a further alternative, instead of closing the tap 34 in action 132 responsive to the inter-exchange hand-off, the previously serving mobile switching center 18(1) may respond to the message 130 by continuing with the monitoring but also sending to the monitoring center 28 in the message 134 an indication that a hand-off has occurred (HO) along with a time-stamp (time) indicating when the hand-off occurred so that the law enforcement agency will be able to segregate that portion of the monitored call which happened prior to hand-off from that portion of the monitored call which happened after hand-off. If desired, location information may also be provided within the message 134 as discussed above.

It is recognized that in some instances a call may proceed through more than one inter-exchange hand-off. When path minimization procedures are not utilized, the result of these multiple hand-off operations will result in the inclusion of at least one tandem exchange in the call connection. The operations of FIGS. 2 and 3 apply equally to each inter-exchange hand-off, and would thus cover operations in connection with tandem exchanges. Similar control over the existence of the tap connection as well as the conveyance of hand-off, time stamping, and location information is provided with respect to the tandem exchange.

FIGS. 2 and 3 focus on the scenario where one exchange is authorized to monitor the call and the other exchange is not so authorized. However, some of the processes and results of the present implementation may be extended to situations where the call is authorized for monitoring in both exchanges that are implicated by the inter-exchange hand-off. For example, the operation of the exchanges to communicate hand-off, time stamping, and location information to the monitoring center may be implemented from more than one, if not all, implicated exchanges in the call connection. As another example, the command to terminate the tap connection may be issued from a subsequently monitoring exchange (following hand-off) to a previously monitoring exchange in order to most efficiently utilize tap resources. Still further, it should be recognized that in a situation where the subsequent exchange (following hand-off) is authorized for monitoring, it may note that the call is previously monitored and then not set up its own tap connection, also with an intent to most efficiently utilize tap resources.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. In connection with an inter-exchange hand-off of a non-law enforcement agency monitored mobile station cellular communication from a first exchange to a second exchange, a method for triggering communication monitoring at inter-exchange hand-off, comprising the steps of:

receiving at the second exchange of a message requesting assignment of facilities in the second exchange for use by the communication after inter-exchange hand-off;

determining in response to the received facilities assignment message whether a party to that communication has been marked in the second exchange as being designated for law enforcement agency monitoring; and if so, establishing a tap connection from that second exchange to a law enforcement agency monitoring center to begin monitoring of that communication following the completion of the inter-exchange hand-off.

2. The method as in claim 1 wherein the message requesting assignment of facilities includes an identification of a mobile station that is party to the non-law enforcement agency monitored mobile station cellular communication, the step of determining comprising the step of comparing that identification to a list of identifications stored in the second exchange marking mobile stations for law enforcement monitoring.

3. The method as in claim 2 wherein the identification comprises one of a mobile directory number (MDN), mobile identification number (MIN), international mobile station identification (IMSI) number, electronic serial number (ESN), and IP address.

4. The method as in claim 1 further including the step of sending, in connection with the establishment of the tap connection, a message from the second exchange to the monitoring center of a current location of the marked party.

5. The method as in claim 1 further including the step of sending, in connection with the establishment of the tap connection, a message from the second exchange to the monitoring center including an indication that the tap connection is being established in connection with the communication undergoing an inter-exchange hand-off.

6. The method as in claim 1 further including the step of sending, in response to completion of the inter-exchange hand-off, a message from the first exchange to the monitoring center of a current location of the marked party.

7. In connection with an inter-exchange hand-off of a law enforcement agency monitored mobile station cellular communication from a first exchange to a second exchange, a method for terminating the monitoring of that communication at inter-exchange hand-off, comprising the steps of:

receiving at the second exchange of a message requesting assignment of facilities in the second exchange for use by the communication after inter-exchange hand-off;

determining in response to the received message whether law enforcement agency monitoring of that communication is lawfully authorized with respect to the second exchange; and if not, sending a tap connection termination message from that second exchange to the first exchange instructing the first exchange terminate its tap connection with a law enforcement agency monitoring center following the completion of the inter-exchange hand-off.

8. The method as in claim 7 wherein the message requesting assignment of facilities includes an identification of a mobile station that is party to the law enforcement agency monitored mobile station cellular communication, the step of determining comprising the step of comparing that identification to a list of identifications stored in the second exchange marking mobile stations that are lawfully authorized for law enforcement monitoring.

9. The method as in claim 8 wherein the identification comprises one of a mobile directory number (MDN), mobile identification number (MIN), international mobile station identification (IMSI) number, electronic serial number (ESN), and IP address.

10. The method as in claim 7 wherein the message comprises information identifying the mobile station as being under surveillance.

11. The method as in claim 7 further including the step of sending, in connection with the termination of the tap connection, a message from the first exchange to the monitoring center of a current location of the marked party.

12. The method as in claim 7 further including the step of sending, in connection with the termination of the tap connection, a message from the first exchange to the monitoring center including an indication that the tap connection is being terminated in response to the communication undergoing an inter-exchange hand-off.

13. A cellular communications system, comprising:
   a first exchange through which a mobile station cellular communication is initially being handled, wherein that communication is not being monitored by a law enforcement agency; and
   a second exchange comprising a target for an inter-exchange hand-off of that non-law enforcement agency monitored mobile station cellular communication, the second exchange operating, in response to a request for facilities assignment in connection with the inter-exchange hand-off, to determine whether a party to that communication has been marked in the second exchange as being designated for law enforcement agency monitoring and, if so, establish a tap connection from that second exchange to a law enforcement agency monitoring center to begin monitoring of that communication following the completion of the inter-exchange hand-off.

14. The system as in claim 13 wherein the request for facilities assignment includes an identification of a mobile station that is party to the non-law enforcement agency monitored mobile station cellular communication, the second exchange further operating to compare that identification to a list of identifications stored in the second exchange marking mobile stations for law enforcement monitoring.

15. The system as in claim 14 wherein the identification comprises one of a mobile directory number (MDN), mobile identification number (MIN), international mobile station identification (IMSI) number, electronic serial number (ESN), and IP address.

16. The system as in claim 13, the second exchange further operating, in connection with the establishment of the tap connection, to send a message to the monitoring center of a current location of the marked party.

17. The system as in claim 13, the second exchange further operating, in connection with the establishment of the tap connection, to send a message to the monitoring center including an indication that the tap connection is being established in connection with the communication undergoing an inter-exchange hand-off.

18. A cellular communications system, comprising:
   a first exchange through which a mobile station cellular communication is initially being handled, wherein that communication is being monitored through a tap connection from the first exchange to a law enforcement agency monitoring center; and
   a second exchange comprising a target for an inter-exchange hand-off of that non-law enforcement agency monitored mobile station cellular communication, the second exchange operating, in response to the inter-exchange hand-off, to determine whether law enforcement agency monitoring of that communication is lawfully authorized with respect to the second exchange and, if not, sending a tap connection termination message to the first exchange instructing the first exchange terminate its tap connection with the law enforcement agency monitoring center.

19. The system as in claim 18 wherein the second exchange receives a message from the first exchange requesting assignment of facilities, that message including an identification of a mobile station that is party to the law enforcement agency monitored mobile station cellular communication, the second exchange further operating to compare that identification to a list of identifications stored in the second exchange marking mobile stations that are lawfully authorized for law enforcement monitoring.

20. The system as in claim 19 wherein the identification comprises one of a mobile directory number (MDN), mobile identification number (MIN), international mobile station identification (IMSI) number, electronic serial number (ESN), and IP address.

21. The system as in claim 18 wherein the first exchange further operates, in connection with the termination of the tap connection, to a message to the monitoring center of a current location of the marked party.

22. The system as in claim 18 wherein the first exchange further operates, in connection with the termination of the tap connection, to send a message to the monitoring center including an indication that the tap connection is being terminated in response to the communication undergoing an inter-exchange hand-off.

* * * * *